United States Patent
Chen et al.

(10) Patent No.: US 6,358,651 B1
(45) Date of Patent: Mar. 19, 2002

(54) SOLID GEL MEMBRANE SEPARATOR IN RECHARGEABLE ELECTROCHEMICAL CELLS

(75) Inventors: Muguo Chen, Bedford Hills; Lin-Feng Li, Croton-on-Hudson; Tsepin Tsai, Chappaqua, all of NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/482,126

(22) Filed: Jan. 11, 2000

Related U.S. Application Data (63) Continuation-in-part of application No. 09/259,068, filed on Feb. 26, 1999.

(51) Int. Cl.[7] .................................................. H01M 2/16
(52) U.S. Cl. ...................................... 429/303; 29/623.1
(58) Field of Search ........................... 429/303, 27, 28, 429/29; 29/623.1

(56) References Cited

U.S. PATENT DOCUMENTS

| | | | |
|---|---|---|---|
| 4,007,059 A | * | 2/1977 | Witherspoon et al. |
| 4,113,931 A | * | 9/1978 | Goldstein et al. |
| 4,585,710 A | | 4/1986 | McEvoy .................... 429/27 |
| 4,681,698 A | | 7/1987 | Graham et al. .......... 252/182.1 |
| 4,708,981 A | * | 11/1987 | Zupancic et al. |
| 4,957,826 A | * | 9/1990 | Cheiky |
| 5,183,872 A | | 2/1993 | Heidel et al. ............... 527/300 |
| 6,127,061 A | * | 10/2000 | Shun et al. |

FOREIGN PATENT DOCUMENTS

| | | |
|---|---|---|
| EP | 0 323 006 A2 | 7/1989 |
| EP | 0 474 617 A1 | 3/1992 |
| EP | 0 651 455 A1 | 5/1995 |
| JP | 07153489 | 6/1995 |
| WO | WO 97/34186 | 9/1997 |

* cited by examiner

Primary Examiner—Carol Chaney
(74) Attorney, Agent, or Firm—Heslin Rothenberg Farley & Mesiti P.C.

(57) ABSTRACT

Rechargeable electrochemical cells that employ a highly conductive polymer-based solid gel membrane separator disposed between the anode and charging electrode are disclosed. The separator comprises a support or substrate and a polymeric gel composition having an ionic species contained in a solution phase thereof. In preparing the separator, the ionic species is added to a monomer solution prior to polymerization and remains embedded in the resulting polymer gel after polymerization. The ionic species behaves like a liquid electrolyte, while at the same time, the polymer-based solid gel membrane provides a smooth impenetrable surface that allows the exchange of ions for both discharging and charging of the cell. Advantageously, the separator reduces dendrite penetration and prevents the diffusion of reaction products such as metal oxide to remaining parts of the cell. Furthermore, the measured ionic conductivity of the separator is much higher than those of prior art solid electrolytes or electroyte-polymer films. The disclosed rechargeable electrochemical cells include, for example, metal/air, Zn/Ni, $Zn/MnO_2$, Zn/AgO, Fe/Ni, and lead-acid systems.

42 Claims, 7 Drawing Sheets fig. 1 fig. 2 fig. 3 fig. 4 fig. 5 fig. 6 fig. 7

SOLID GEL MEMBRANE SEPARATOR IN RECHARGEABLE ELECTROCHEMICAL CELLS

This application is a Continuation-in-Part application of co-pending application Ser. No. 09/259,068, filed Feb. 26, 1999 entitled SOLID GEL MEMBRANE.

FIELD OF THE INVENTION

This invention relates generally to rechargeable electrochemical cells and more particularly to rechargeable electrochemical cells in which an ionic-conducting polymer-based solid gel membrane is used as a separator.

BACKGROUND OF THE INVENTION

Electrochemical devices generally incorporate an electrolyte source to provide the anions or cations necessary to produce an electrochemical reaction. A zinc/air system, for example, requires the diffusion of hydroxide anions, and typically will incorporate an aqueous potassium hydroxide solution as the electrolyte. The lifetime of this battery is however, limited for several reasons. First, the naked zinc anode is corroded by both the aqueous electrolyte and air. Second, the air channels of the air cathode gradually become blocked by water from the electrolyte solution and third, the electrolyte solution becomes contaminated with zinc oxidation product that diffuses from the anode.

Various methods have been used to address the many problems associated with the use of aqueous electrolytes in zinc anode based systems such as zinc/air fuel cells. Additives, for example, have been introduced into the electrolyte solution to extend its lifetime and to protect the anode from corrosion. U.S. Pat. No. 4,118,551 discloses the use of inorganic additives such as mercury, indium, tin, lead, lead compounds, cadmium or thallium oxide to reduce corrosion of a zinc electrode. Many of these additives however, are expensive and more significantly, are very toxic. U.S. Pat. No. 4,378,414 discloses the use of a multi-layer separator between the positive and negative electrodes to reduce corrosion of the anode and contamination of the electrolyte by zinc oxidation products. In addition, hydrophobic materials have been introduced into zinc/air devices to prevent water permeation into the air channels of the cathode. Introduction of hydrophobic materials is however, a difficult process and may result in decreased performance of the cathode.

In addition to zinc/air systems, other metal/air systems, such as aluminum/air, lithium/air, cadmium/air, magnesium/air, and iron/air systems, also have the potential for many different applications due to their theoretically high ampere-hour capacity, voltage, and specific energy. In actual practice however, these very promising theoretical values are greatly reduced due to the corrosion of the metal anode in the electrolyte.

A solid state hydroxide conductive electrolyte polybenzimidazole ("PBI") film is disclosed in U.S. Pat. No. 5,688,613 and comprises a polymeric support structure having an electrolyte active species dispersed therein, wherein the polymer structure is in intimate contact with both the anode and the cathode. This PBI film, however, does not absorb water and therefore, does not hold water within the membrane, causing it to dry out quickly.

U.S. Pat. No. 3,871,918 discloses an electrochemical cell embodying an electrode of zinc powder granules suspended in a gel comprised of methylenebisacrylamide, acrylic acid and acrylamide. Potassium hydroxide serves as the electrolyte, and is contained within the gel.

With regard to devices that rely on the conduction of cations, while there has been a significant amount of research in this area, most proton conducting membranes are very expensive to produce and typically do not function at room temperature. In the 1970's for example, a fully fluorinated polymer membrane, NAFION® (DuPont, Wilmington, Del. USA) was introduced and has served as the basis from which subsequent proton conducting membranes have evolved.

U.S. Pat. No. 5,468,574 discloses a proton conductive membrane that is characterized as a highly sulfonated polymeric membrane composed of block copolymers of sulfonated polystyrene, ethylene and butylene blocks. In 1997, NASA's Jet Propulsion Laboratory disclosed the development of an improved proton conductive membrane composed of sulfonated poly(ether ether ketone), commonly known as H-SPEEK.

The separator in a cell or battery physically separates and electrically insulates electrodes of different polarity. While serving as a barrier to the transport of active materials of the different electrodes, a separator should also provide ionic conduction. Good ionic conductivity is necessary to ensure that an electrochemical cell/battery is capable of delivering usable amounts of power for a given application.

In a rechargeable electrochemical cell, a separator is also used to prevent short circuiting caused by metal dendrite penetration during recharging. For example, in rechargeable zinc/air cells, zinc on the surface of the negative zinc electrode (anode) is dissolved as zincate ion into the electrolyte solution during discharge. Then, during the charge, when the charging current is typically below 20 mA/cm$^2$, depending on the particular anode used, the zincate ion forms dendritic zinc, which is needle-like and grows from the negative electrode toward the charging electrode. Unfortunately, these needle-like structures can pierce through conventional separators causing an internal short circuit. The service life of the cell is consequently terminated. In addition to preventing dendrite penetration, the separator must allow for the exchange of electrolytic ions during both discharging and charging of the cell.

The most commonly used separators in rechargeable cells are porous insulator films of polyolefins, polyvinyl alcohol (PVA), nylon, or cellophane. Acrylic compounds may also be radiation-grafted onto these separators to make them more wettable and permeable to the electrolyte. Although much work has been done to improve the performance of separators, dendrite penetration problems are frequently encountered with these and other conventional separators, as well as problems involving diffusion of reaction products such as the metal oxide to remaining parts of the cell.

With conventional separators, controlling the pore size of the separator is the only effective way to avoid dendrite penetration and prevent product diffusion. By doing this, however, the ionic conductivity of the separator is also greatly reduced. This creates a bottleneck for high charging-discharging current density operations, important considerations for use in some applications, such as in electrical vehicles.

U.S. Pat. No. 5,549,988 discloses an electrolyte system separator disposed between the cathode and anode of a rechargeable electrochemical battery. The electrolyte system includes a polymer matrix prepared from polyacrylic acid or derivatives thereof. An electrolyte species, such as KOH or $H_2SO_4$, is then added to the polymer matrix to complete the system. However, as reported in the patent, the measured ionic conductivities of the disclosed electrolyte-polymer films are low, ranging from 0.012 S/cm to 0.066 S/cm. Although these conductivities are acceptable for some applications, they are inadequate for other high rate operations including electrical vehicles.

An electrochemical reaction is also involved in the function of electrochromic devices (ECD's). Electrochromism is broadly defined as a reversible optical absorption change induced in a material by an electrochemical redox process. Typically, an electrochromic device contains two different electrochromic materials (ECM's) having complementary properties; the first is generally reduced, undergoing a color (1)-to-color (2) transition during reduction, while the second material is oxidized, undergoing a similar transition upon the loss of electrons.

Basically, there are two types of electrochromic devices, depending upon the location of the electrochromic materials within the device. In a thin-film type device, the two ECM's are coated onto the two electrodes and remain there during the redox coloration process. In a solution-phase device, both ECM's are dissolved in an electrolyte solution and remain their during the coloration cycle. The solution-phase device is typically more reliable and has a longer lifetime, however, in order to maintain the colored state, an external power source must be continuously applied. As the thin-film type device does not need an external power source to maintain its colored state, power consumption is greatly reduced, making this an advantage for such energy-saving applications as smart windows. The drawback of the thin-film type device is that it has a short lifetime. After a certain number of cycles, ECM films can lose contact with the electrode, or they may no longer be capable of phase change and the device expires.

With regard to solution-phase devices, U.S. Pat. No. 5,128,799, for example, discloses a method of reducing the current required to maintain the colored state which involves the addition of gel into the device. While reducing energy consumption however, the addition of the gel into the device also greatly reduces the switching speed of the device. With regard to thin-film devices, attempts to extend the lifetime of the device have included changes to the crystal structure of the film. While such changes have increased the lifetime of thin-film devices to an extent, the typical lifetime of such devices is still not satisfactory.

The foregoing problems thus present major obstacles to the successful development and commercialization of fuel cell technology, a green energy source, and of electrochromic devices such as smart windows and flat panel displays, which have several energy-saving, decorative, and information display applications. With respect to the problems associated with rechargeable electrochemical cells, it is clear that there is a great need for a separator that can provide improved ionic conductivity while providing an effective barrier against the penetration of metal dendrites and the diffusion of reaction products.

SUMMARY OF THE INVENTION

The present invention provides polymer-based solid gel membranes that contain ionic species within the gel's solution phase and that are highly conductive to anions or cations. In accordance with the principles of the invention, solid gel membranes may be produced for use in such power sources as, for example, metal/air (e.g. zinc/air, cadmium/air, lithium/air, magnesium/air, iron/air, and aluminum/air), Zn/Ni, Zn/MnO$_2$, Zn/AgO, Fe/Ni, lead-acid, Ni/Cd, and hydrogen fuel cells, as well as for use in electrochromic devices, such as smart windows and flat panel displays.

Additionally, the instant polymeric solid gel membranes are useful in rechargeable electrochemical cells, wherein the solid gel membrane is employed as a separator between the charging electrode and the anode.

With respect to a zinc/air fuel cell battery, for example, conductive membranes of the present invention may be used to protect the anode, as well as the cathode. In such a system, the ionic species is contained within the solution phase of the solid gel membrane, allowing it to behave as a liquid electrolyte without the disadvantages. The gel membrane protects the anode from corrosion (by the electrolyte as well as by air) and prevents zinc oxidation product from the anode from contaminating the electrolyte. With regard to the cathode, as the membrane is itself a solid, there is no water to block the air channels of the cathode. As a result, the system will have an extended lifetime.

As used herein, the term "anode" refers to and is interchangeable with the term "negative electrode". Likewise, "cathode" refers to and is interchangeable with the term "positive electrode".

The present invention also includes rechargeable electrochemical cells that use the solid gel membrane as a separator between the anode and charging electrode. Such a separator provides many advantages that conventional separators lack. For example, it provides a smooth impenetrable surface that allows the exchange of ions for both discharging and charging of the cell while preventing fast dendrite penetration and the diffusion of reaction products such as metal oxide to remaining parts of the cell. Furthermore, the measured ionic conductivities of the present solid gel membranes are much higher than those of prior art solid electrolytes or electrolyte-polymer films. For example, the observed conductivity values for the present separators are surprisingly about 0.10 S/cm or more. Even more surprisingly, ionic conductivities as high as 0.36 S/cm have been measured, and it is possible that higher values still may be observed. Thus, these unique and unprecedented properties distinguish the separator of the present invention from previous designs that merely trap dendrite growth and slow penetration.

Accordingly, the principles of the present invention relate, in one aspect, to a rechargeable electrochemical cell comprising a separator, an anode, a cathode, and a charging electrode. Optionally, a liquid electrolyte, such as one of those mentioned herein and/or commonly known by those of skill in the art, may also be included in the rechargeable cell. The liquid (aqueous) electrolyte contacts the separator, each electrode, and a porous spacer, if employed. The separator comprises an ion-conducting polymer-based solid gel membrane which includes a support onto which a polymer-based gel having an ionic species contained within a solution phase thereof is formed. The support may be a woven or nonwoven fabric or one of the electrodes.

The polymer-based gel comprises a polymerization product of one or more monomers selected from the group of water soluble ethylenically unsaturated amides and acids. The polymer-based gel also includes a water soluble or water swellable polymer, which acts as a reinforcing element. In addition, a chemical polymerization initiator (listed below) may optionally be included. The ionic species is added to a solution containing the polymerization initiator (if used), the monomer(s), and the reinforcing element prior to polymerization, and it remains embedded in the polymer gel after the polymerization.

Polymerization is carried out at a temperature ranging from room temperature to about 130° C., but preferably at an elevated temperature ranging from about 75° to about 100°

C. Higher heating temperatures, such as those ranging from about 95° to about 100° C., provide a stiffer polymer surface, which is a desirable property in rechargeable cell applications. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, γ-rays or x-rays.

In the rechargeable cell, the cathode and charging electrode may be a single bifunctional electrode or may be individual and separate electrodes. The separator is positioned between the anode and charging electrode. In alkaline systems, the hydroxide ionic species typically comes from an aqueous alkaline solution of potassium hydroxide, sodium hydroxide, lithium hydroxide, or combinations thereof. Preferably in a potassium hydroxide solution, for example, the base has a concentration ranging from about 0.1 wt. % to about 55 wt. %, and most preferably about 37.5 wt. %. In acidic systems, the proton comes from an aqueous acidic electrolyte solution, such as a solution of perchloric acid, sulfuric acid, hydrochloric acid, or combinations thereof. The concentration of perchloric acid, for example, preferably ranges from about 0.5 wt. % to about 70 wt. %, and most preferably about 13.4 wt. %. The membrane separator may also be used in neutral systems, wherein the ionic species comes from a saturated aqueous neutral solution of ammonium chloride and potassium sulfate; a saturated solution of ammonium chloride, potassium sulfate, and sodium chloride; or a saturated neutral solution of potassium sulfate and ammonium chloride.

When the cathode and charging electrode are individual and separate electrodes, the charging electrode is positioned between the separator and cathode, and a porous spacer is optionally positioned between the charging electrode and cathode.

In another aspect, the invention is a rechargeable electrochemical cell comprising a separator, a metal anode (preferably zinc), an air cathode, and a charging electrode. In this system, the separator is a hydroxide conducting polymer-based solid gel membrane comprising a support onto which a polymer-based gel having a hydroxide species contained within a solution phase thereof is formed. The polymer-based gel comprises polysulfone as a reinforcing element and a polymerization product of a polymerization initiator, methylenebisacrylamide, acrylamide, and methacrylic acid. The hydroxide species comes from an aqueous alkaline solution (ranging from about 0.1 wt. % to about 55 wt. % potassium hydroxide, sodium hydroxide, lithium hydroxide, or a mixture thereof), which is added to the polymerization initiator, methylenebisacrylamide, acrylamide, methacrylic acid, and polysulfone prior to polymerization. The air cathode and charging electrode may be a single bifunctional electrode or may be individual and separate electrodes. The separator is positioned between the metal anode and charging electrode. The ionic conductivity of the separator typically ranges from about 0.10 S/cm to about 0.36 S/cm, but may be higher.

In another aspect, the present invention is an electrochemical cell comprising first and second electrodes and one or more polymer based solid gel membranes disposed there between. In one embodiment, the electrochemical cell is a zinc/air cell having an anode protective solid gel membrane and a hydroxide conducting solid gel membrane disposed between the zinc anode and the air cathode. In another embodiment of a zinc/air system, both the anode and cathode are protected by a solid gel membrane of the present invention, and an aqueous electrolyte is disposed between the two.

In a further embodiment of this aspect of the invention, the electrochemical cell is an aluminum/air cell, wherein a hydroxide conductive solid gel membrane is applied to the aluminum anode to protect it from corrosion.

In yet a further embodiment of this aspect of the invention, the electrochemical cell is an aluminum/air cell, wherein a hydroxide conductive solid gel membrane is disposed between the aluminum anode and the air cathode.

Accordingly, the principles of the present invention also provide a method of inhibiting corrosion of a metal anode in a metal/air fuel cell system comprised of a metal anode and an air cathode. The method comprises disposing one or more polymer based solid gel membranes between said anode and said cathode.

In yet a further embodiment of the invention, the electrochemical cell is a proton or hydroxide conducting power source, such as a hydrogen fuel cell system. In this embodiment, a proton or hydroxide conductive solid gel membrane may be sandwiched between the hydrogen anode and the air cathode, thus separating the hydrogen and the air, while allowing the diffusion of proton or hydroxide ions. This embodiment provides several advantages over prior art proton conducting membranes in that the solid gel membranes of the present invention are much easier and less expensive to produce than earlier membranes and, more importantly, unlike previous membranes, the solid gel membranes of the present invention will function efficiently at room temperature.

The principles of the present invention may also be applied to electrochromic devices. Here, the electrochromic materials of the device are contained within solid gel membranes, thus providing the device with the reliability and long lifetime associated with solution phase EC systems, and also the energy-saving memory properties associated with thin-film EC systems.

Accordingly, yet another embodiment of the present invention is an electrochromic device wherein electrochromic materials are contained within polymer based solid gel membranes. Typically, such a device will involve two electrode substrates and electrochromic materials contained within solid gel membranes sandwiched there between. The device may optionally include an aqueous or a solid electrolyte disposed between the solid gel membranes. The electrode substrates may be comprised of such materials as, for example, platinum, gold, conductive glass, such as indium-tin oxide glass, and the like.

BRIEF DESCRIPTION OF THE DRAWINGS

Numerous other advantages and features of the present invention will become readily apparent from the following detailed description of preferred embodiments when read in conjunction with the accompanying drawings, wherein.

DETAILED DESCRIPTION OF PREFERRED EMBODIMENTS

Figure 1:
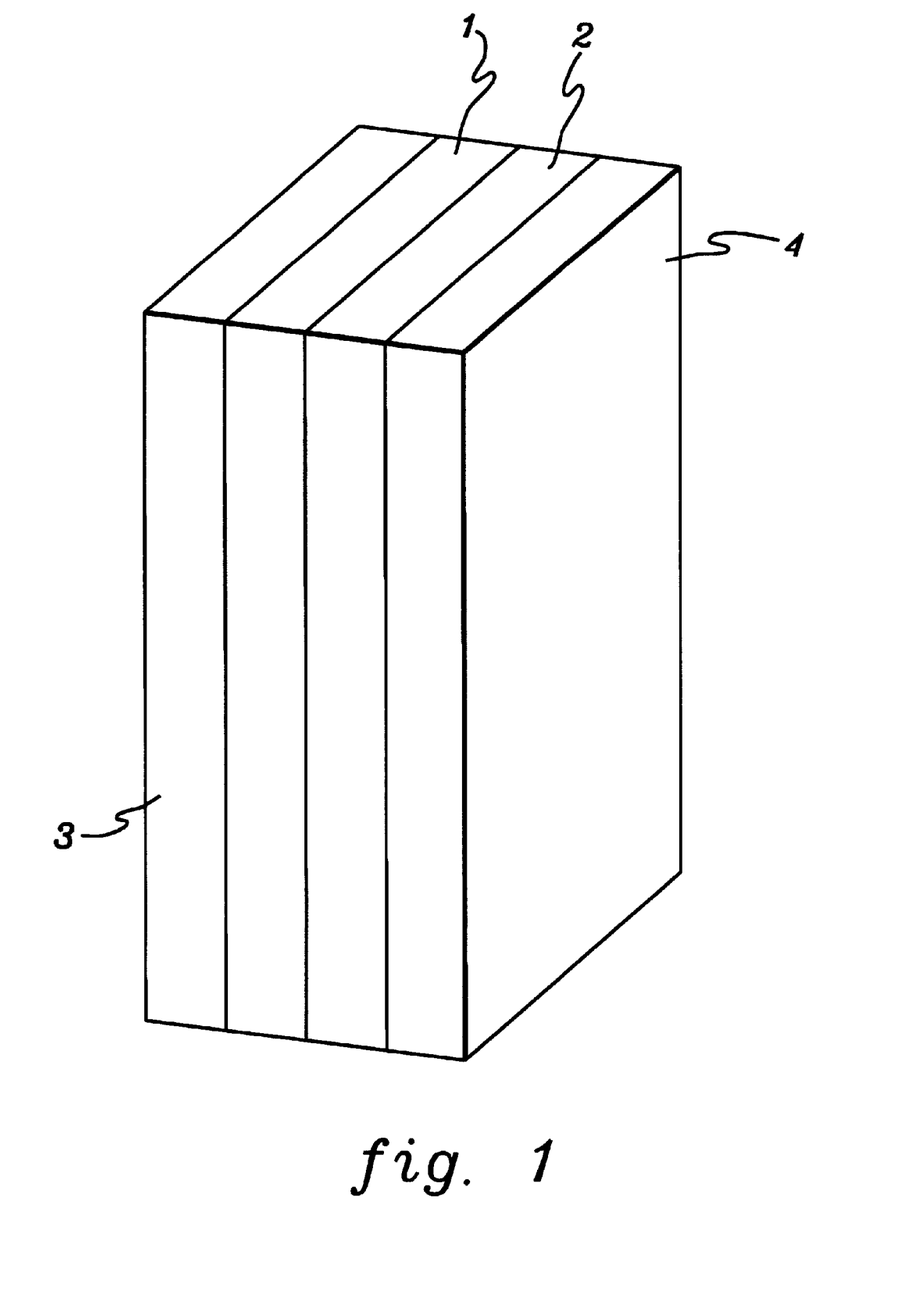
FIG. 1 is a schematic depiction of a zinc/air fuel cell incorporating an anode protective membrane and a hydroxide conducting membrane of the present invention.
Figure 2:
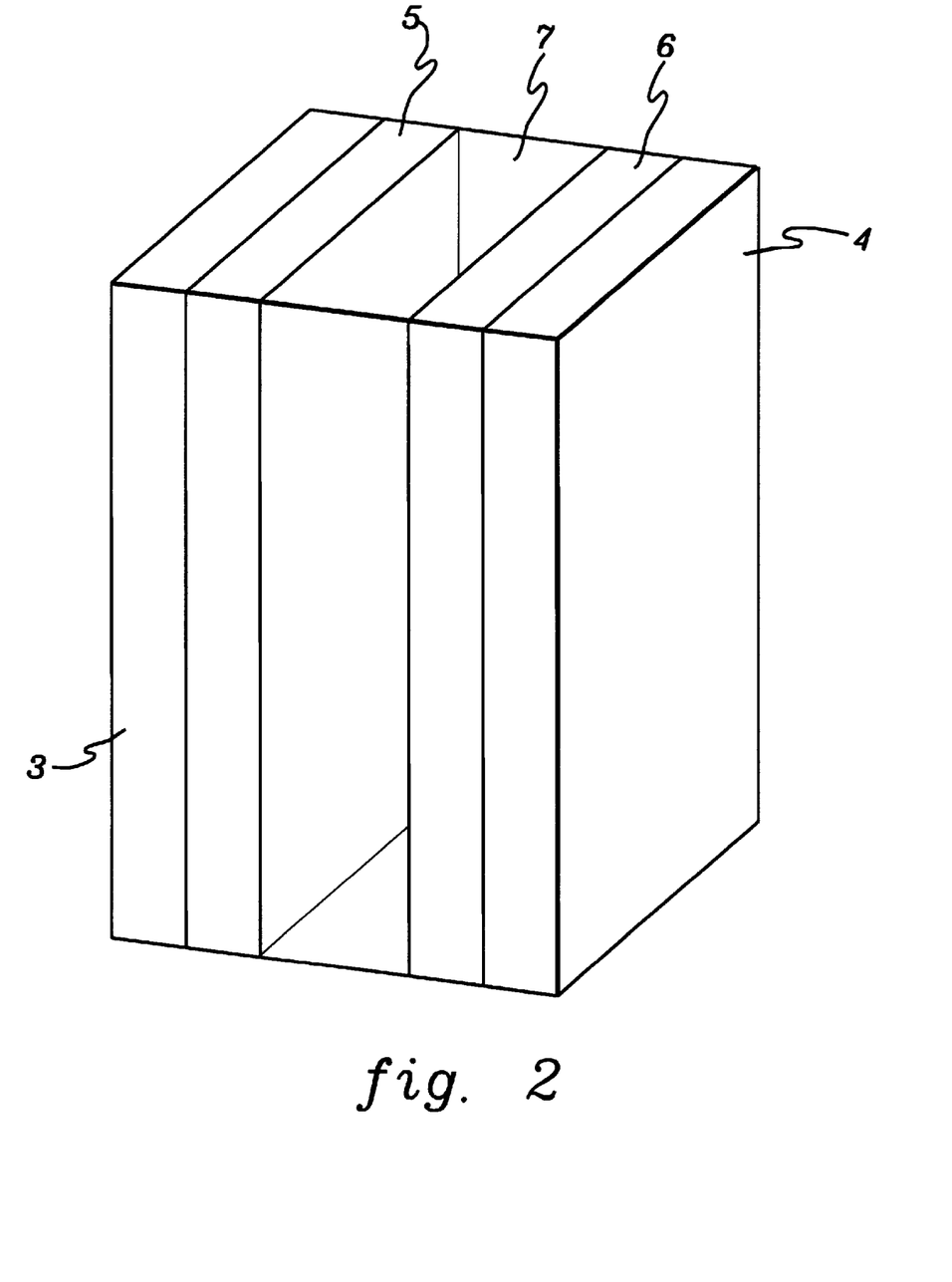
FIG. 2 is a schematic depiction of another embodiment of a zinc/air fuel cell incorporating both an anode and a cathode protective membrane of the present invention.

Referring now to the drawings, FIG. 1 depicts a typical zinc/air fuel cell, wherein two polymer-based solid gel membranes (1, 2) are disposed between the zinc anode (3) and the air cathode (4). The first is an anode protective membrane (1) and the second is a hydroxide conductive membrane (2). The membranes are not only the source of ionic species, and are highly conductive to that species, but they also provide a protective layer to the electrodes to prevent the usual sources of cell destruction. The membranes prevent diffusion of zinc oxidation product into the electrolyte solution phase, they prevent corrosion of the zinc anode by either the electrolyte solution or air, and they prevent blockage of the cathode air channels by water from the electrolyte solution. The zinc/air system of FIG. 2 includes a protective and conductive solid gel membrane (5, 6) on the surface of the zinc anode (3) and the air cathode (4), and an aqueous electrolyte (7) between the two.

Figure 3:
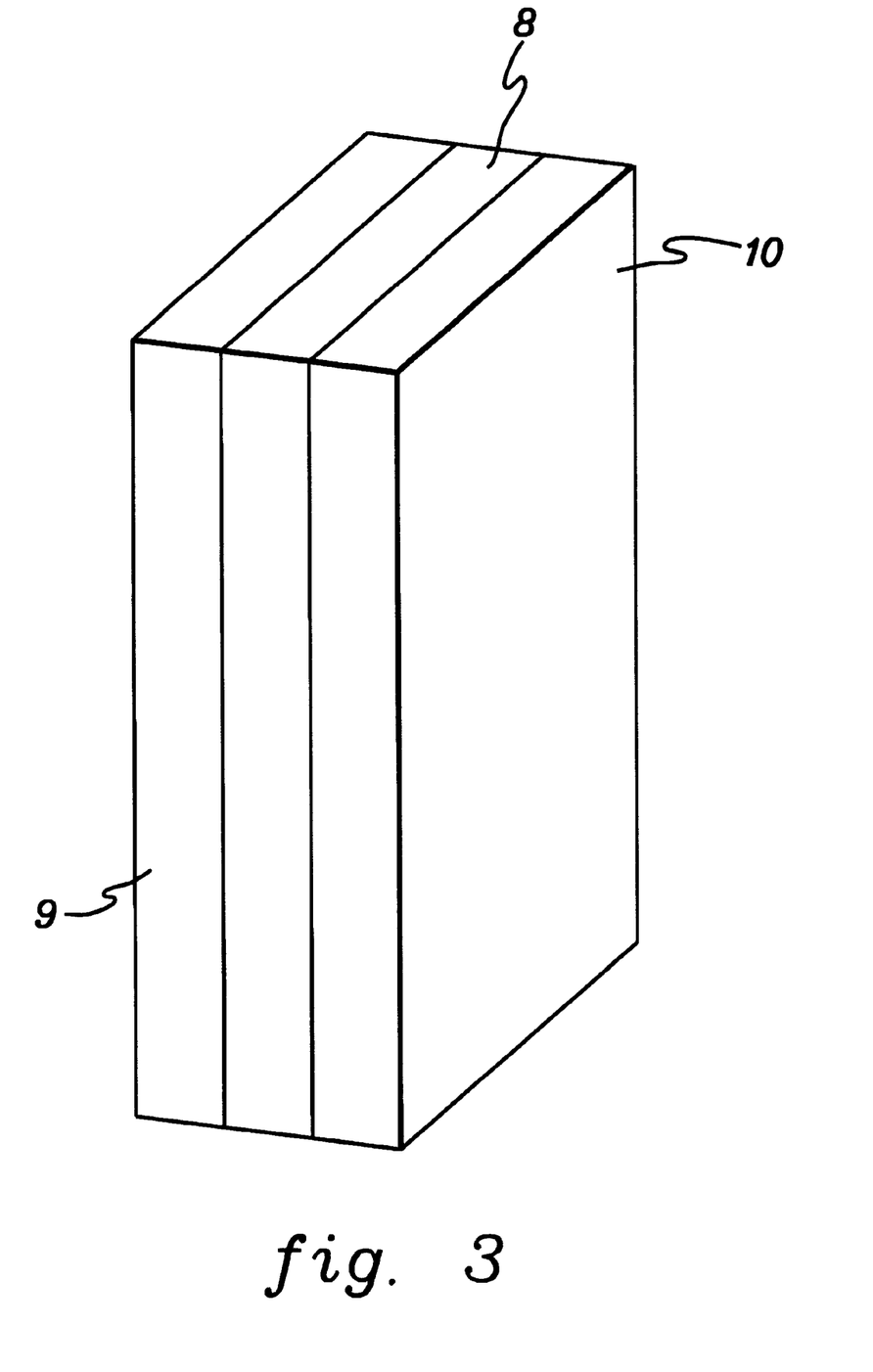
FIG. 3 is a schematic depiction of an aluminum/air fuel cell incorporating a hydroxide conductive membrane of the present invention.

Referring now to FIG. 3, an aluminum/air fuel cell system incorporating a solid gel hydroxide conductive membrane (8) between the aluminum anode (9) and the air cathode (10) is depicted. As in the zinc/air system, the solid gel membrane of this embodiment serves to prevent the corrosion problems associated with the use of pure liquid electrolyte and also serves as the ionic conducting media.

Figure 4:
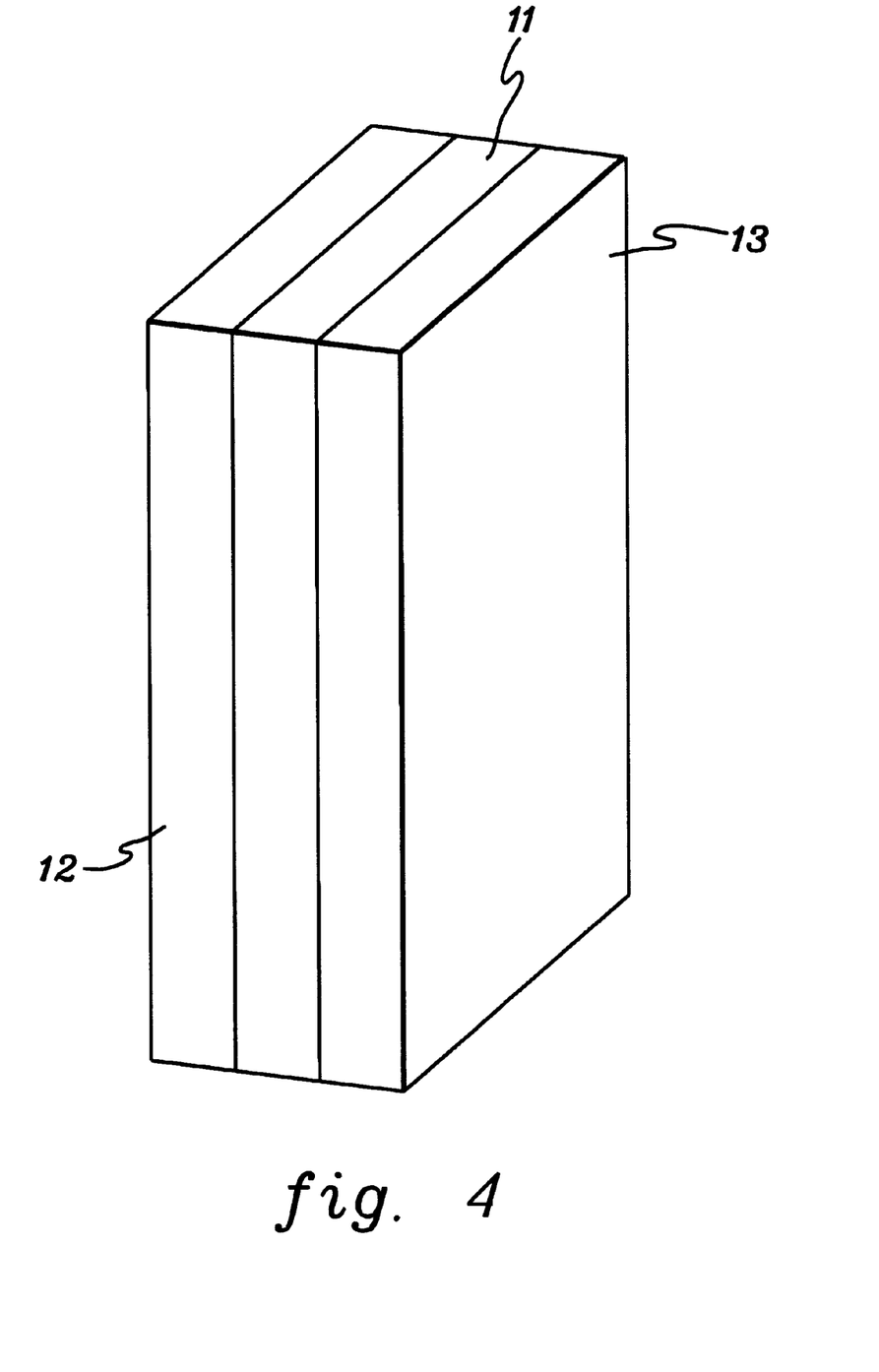
FIG. 4 is a schematic depiction of a hydrogen/air fuel cell incorporating a proton or hydroxide conductive membrane of the present invention.

As illustrated in FIG. 4, when applied to the art of hydrogen fuel cells, the principles of the present invention provide a proton or hydroxide conductive membrane that is easy to produce, much less expensive than existing proton conductive membranes and that functions well at room temperature. Because the actual conducting media remains in aqueous solution within the polymer gel backbone, the conductivity of the membrane is comparable to that of liquid electrolytes, which at room temperature is significantly high. In this embodiment of the invention, a proton or hydroxide conductive solid gel membrane (11) is sandwiched between the hydrogen anode (12) and the air cathode (13), thereby separating the hydrogen and the air.

Figure 5:
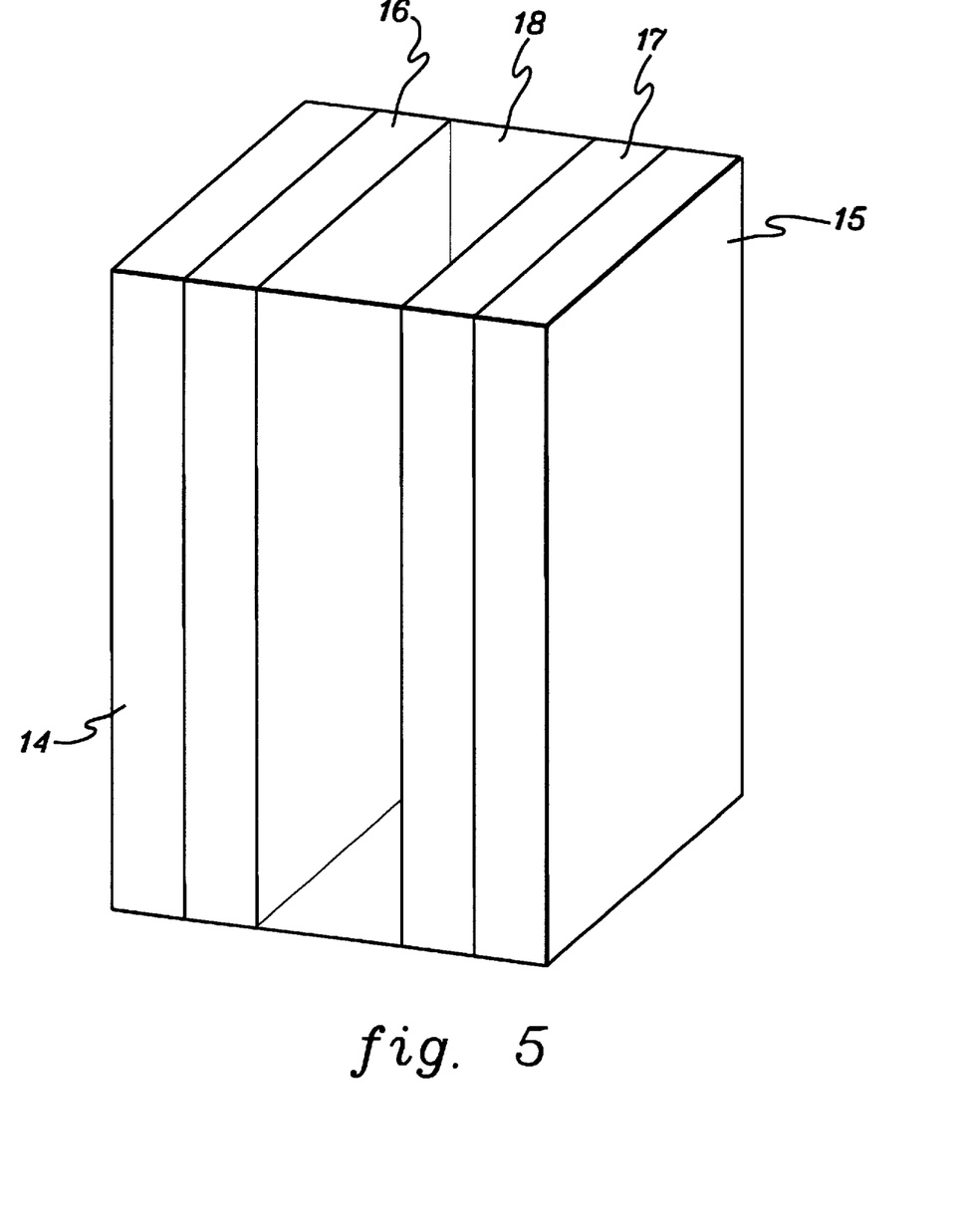
FIG. 5 is a schematic depiction of an electrochromic device wherein the electrochromic materials are contained within membranes of the present invention.

As shown in FIG. 5, the principles of the present invention may also be applied to electrochromic systems. Here, the electrochromic materials are dispersed within the solution phase of the polymer gel backbone of a solid gel membrane. Since the ECM's are in solution, the device exhibits the superior reliability and long life of a solution phase device and in addition, because the ECM's are physically confined, they can not diffuse into the device's bulk electrolyte and the device therefore also exhibits the superior memory of a thin-film type device. As shown, the device includes two electrode substrates (14, 15) having solid gel membrane encapsulated electrochromic materials (16, 17) there between. As illustrated, the device optionally includes an aqueous or solid electrolyte (18) disposed between solid gel membranes (16, 17).

Figure 6:
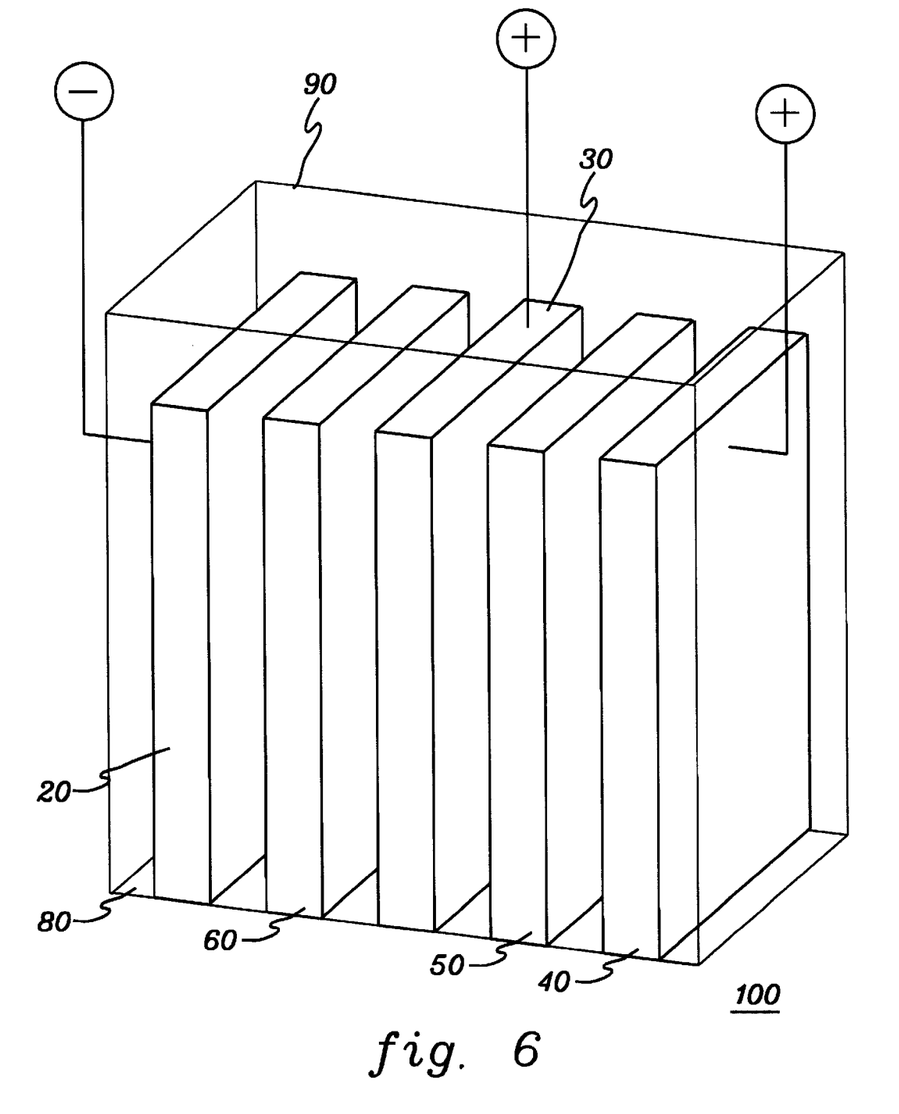
FIG. 6 is a schematic depiction of a rechargeable metal/air battery having three electrodes, a porous spacer, and a solid gel membrane incorporated as a separator in accordance with the present invention.

Referring to FIG. 6, there is illustrated therein a rechargeable electrochemical cell (100) fabricated from three electrode assemblies, (20, 30, 40) and contained within housing (90). Electrode (20) represents the negative electrode or metal anode; electrode (40) is the positive electrode, i.e. air cathode; and electrode (30) is a porous charging electrode. In this embodiment, cathode (40) and charging electrode (30) are separate electrodes, and charging electrode (30) is positioned between cathode (40) and the solid gel separator. As shown in the drawing, the three electrodes (20, 30, 40) are disposed in spaced apart, parallel relationships with one another. Rechargeable electrochemical cell (100) optionally includes liquid (aqueous) electrolyte (80) in contact with each electrode, separator (60), and porous spacer (50) (when employed) typically by immersion.

Metal anode (20) is made of an oxidizable metal, preferably zinc, cadmium, lithium, magnesium, iron, or aluminum, but metal anode (20) is most preferably zinc. Air cathode (40) preferably has a current density of at least 200 mA/cm$^2$. An exemplary air cathode is disclosed in copending, commonly assigned U.S. Patent Application entitled ELECTROCHEMICAL ELECTRODE FOR FUEL CELL, filed on Oct. 8, 1999 and corresponding to Ser. No. 09/415,449, which is incorporated herein by reference in its entirety. Other air cathodes may instead be used, however, depending on the performance capabilities thereof, as will be obvious to those of skill.

As shown in FIG. 6, porous charging electrode (30) is positioned in parallel relationship between metal anode (20) and air cathode (40). Any inert conductive porous material may be used to form porous charging electrode (30). Examples include, but are not limited to platinum, nickel, nickel oxide, perovskite and its derivatives, carbon, and palladium. In addition, apertures or holes may be drilled into charging electrode (30) to aid with the passage of ions. It is important that the electrodes do not physically contact each other, and a distance therebetween sufficient to form a gap for the electrolyte must be provided.

In addition, it is sometimes desirable to position porous spacer (50) between charging electrode (30) and air cathode (40) as a means of ensuring sufficient distance between the two electrodes. When porous spacer (50) is included in rechargeable electrochemical cell (100), a gap is formed for the electrolyte on each side of porous spacer (50) and each electrode (30) and (40). However, the invention is not limited to structures which include porous spacer (50). Any means of preventing physical contact between the two electrodes may be employed, such as anchoring the electrodes apart in the housing. However, when porous spacer (50) is used, it is typically made of a porous plastic material, such as nylon, and typically has a thickness ranging from about 0.1 mm to about 2 mm.

As depicted, separator (60) is disposed in spaced apart, parallel relationship with electrodes (20, 30, 40) and is positioned between charging electrode (30) and metal anode (20). A gap for the electrolyte is provided on each side of separator (60). Alternatively, but not illustrated, when the separator is radiation-grafted onto one of the three electrodes, the electrode provides a support for the separator, and thus no gap exists between the separator and the electrode on which it is formed. In accordance with the present invention, separator (60) functions, in part, to prevent shorting between air cathode (40) and metal anode (20).

Separator (60) comprises an ion-conducting, polymer-based solid gel membrane. This membrane comprises, in part, a support material or substrate, which is preferably a woven or nonwoven fabric, such as a polyolefin, polyvinyl alcohol, cellulose, or a polyamide, such as nylon. Alternatively, the substrate/support may be the anode, charging electrode, or cathode (not illustrated). A polymer-based gel having an ionic species contained within a solution phase thereof, which has been formed on the support material, completes separator (60). More particularly, the polymer-based gel or film portion of the membrane includes an electrolyte in solution with the polymerization product of a polymerization initiator and one or more water-soluble ethylenically unsaturated amide or acid monomers, preferably methylenebisacrylamide, acrylamide, methacrylic acid, acrylic acid, 1-vinyl-2-pyrrolidinone, or combinations thereof. Other suitable monomers are listed below.

Prior to initiating the polymerization, the ingredients are dissolved in water, and, in this embodiment, an aqueous hydroxide electrolyte solution (e.g. KOH) having a hydroxide ion concentration ranging from about 0.1 wt. % to about 55 wt. %, but preferably about 37.5 wt. %, is added to produce the ionic species. Suitable hydroxide electrolytes include, for example, potassium hydroxide, sodium hydroxide, lithium hydroxide, or combinations thereof. Alternatively, the ionic species may come from a neutral aqueous solution prepared from combinations of ammonium chloride, potassium sulfate, and/or sodium chloride. The electrolyte is added to the monomer solution prior to polymerization and remains in solution after the polymerization.

Also prior to the polymerization process, an ionic polymer, such as polysulfone (anionic) or poly(sodium-4-styrenesulfonate) is added to the monomer solution as a reinforcing element. The addition of the reinforcing element enhances the ionic conductivity and mechanical strength of the separator. Optionally, a crosslinking agent, such as methylenebisacrylamide or ethylenebisacrylamide may also be employed during the polymerization. Other crosslinkers and reinforcing element polymers may be used instead, such as one of those listed below, as would be obvious to those of skill.

To form separator (60) depicted in FIG. 6 (and indicated as reference number (61) in FIG. 7 below), a piece of woven or nonwoven fabric, such as nylon (i.e. a polyamide), for example, is provided as the support, and the selected fabric is soaked in the monomer solution. The solution-coated fabric is cooled, and ammonium persulfate, for example, is optionally added as a polymerization initiator. Other suitable chemical initiators include alkali metal persulfates and peroxides. The fabric coated with the monomer film solution is then placed between glass and polyethylene teraphthalate (PET) film. After heating, the monomer solution is further polymerized by irradiating the "sandwiched" plastic/monomer film with UV light, for example, and the polymer-based gel membrane or separator is produced. The hydroxide ion (or other ions) remains in solution after the polymerization. Thus, polymerization is preferably carried out at an elevated temperature (up to 130° C.) using a chemical polymerization initiator and radiation. However, polymerization to form the polymer-based gel can also be carried out by one of these alternative methods: heating and using a chemical polymerization initiator (no radiation) or heating plus radiation (no chemical initiator); or radiation at room temperature, depending on the strength of the radiation.

Separator (60), thus formed, has a thickness that is typically about 0.3 mm. Preferably, the separator will be as thin as 0.1 mm. However, the invention is not limited to separators ranging in thickness from 0.1 to 0.3 mm. It will be obvious to those of skill whether a particular separator is too thick or too thin, based on its effectiveness in a particular application. The separator provides a source of hydroxide (or other) ions and is highly conductive to that ionic species.

It is important to note that unexpectedly high ionic conductivities (up to 0.36 S/cm thus far), but not previously observed in prior art systems have been achieved using the solid gel membrane separator in the rechargeable electrochemical cells of the present invention. This is, in part, because the electrolyte is added to the monomer solution prior to polymerization. After polymerization, the ionic species remains in solution as part of the polymer-based solid gel, which is disposed on the support or fabric to form the polymer-based solid gel membrane separator (60) (or (61) in FIG. 7). This solid gel membrane or separator also prevents penetration of dendritic metal through the separator and therefore protects the negative electrode from dendrite formation during charging. Furthermore, the solid gel separator also prevents destruction of the cell by preventing diffusion of the metal oxidation product into the electrolyte solution.

Figure 7:
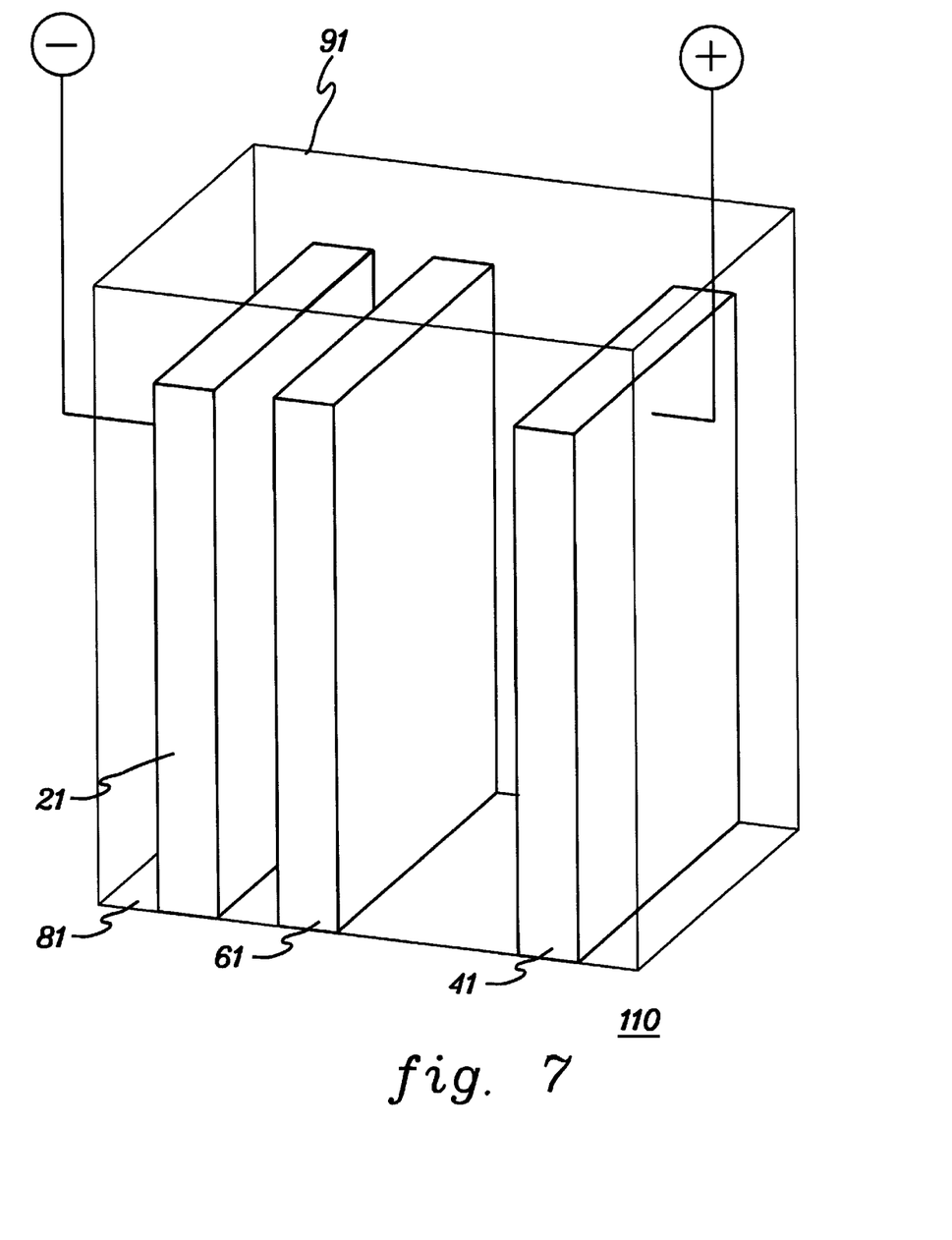
FIG. 7 is a schematic depiction of a rechargeable metal/air battery having an anode, a bifunctional electrode, and a solid gel membrane incorporated as a separator in accordance with the present invention.

FIG. 7 shows rechargeable electrochemical cell (110) of the present invention wherein the cathode and charging electrode form single bifunctional electrode (41), i.e. the electrode is used both as the positive electrode and for charging the battery. Optionally, liquid (aqueous) electrolyte (81) may also be included within the housing of the cell. Separator (61) is disposed between anode (21) and bifunctional electrode (41). Electrochemical cell 110 also includes housing (91).

This dual electrode/separator configuration depicted in FIG. 7 may be used for several different types of rechargeable battery systems. For example, anode (21) may be an oxidizable metal, such as one of those previously listed in connection with FIG. 6 (preferably zinc), and bifunctional electrode (41) may be the previously described air cathode. In another embodiment, anode (21) is zinc or zinc oxide, and bifunctional electrode (41) is nickel oxide, manganese dioxide, silver oxide, or cobalt oxide. Alternatively, anode (21) may be iron or cadmium, and single bifunctional electrode (41) is nickel oxide. In these systems, the ionic species contained in polymer-based gel membrane separator (61) preferably comes from one of the above-listed aqueous alkaline hydroxide solutions and associated hydroxide concentration. However, in the rechargeable metal/air cells of the present invention, a neutral membrane separator (61) can alternately be employed wherein the ionic species comes from one of the above-listed neutral aqueous solutions.

An acidic membrane may be used as separator (61) in acidic systems such as in rechargeable lead-acid batteries wherein anode (21) is lead and bifunctional electrode (41) is lead oxide. In this embodiment, the ionic species contained in separator (61) comes from an aqueous solution of perchloric acid, sulfuric acid, hydrochloric acid, phosphoric acid, or combinations thereof.

In other rechargeable electrochemical cell configurations, not depicted, but mentioned above, the ion-conducting polymer-based solid gel may be grafted directly onto the anode, charging electrode, cathode, or bifunctional electrode, when one is used. In this case, support for the separator or membrane is provided by the electrode substrate on which the polymer-based solid gel is formed.

The shape of the electrolyte solution volume or housing, which is shown as reference number (90) in FIG. 6 and (91) in FIG. 7, is not constrained to be square or rectangular. It can be circular, elliptical, polygonal, or any desired shape. In addition, the cell housing may be fabricated from any strong chemically inert insulation material, such as plastic conventionally used in electrochemical cells and alkaline batteries.

When in operation, conducting wires (not shown), usually copper strips, are adhered to exposed portions of the metal anode, charging electrode, and cathode and/or bifunctional electrode. These conducting wires are used to apply an external voltage to the cell to recharge the anode. An insulating epoxy is typically used to cover the exposed joints.

EXAMPLES

Preferred embodiments of the present invention are hereinafter described in more detail by means of the following examples that are provided by way of illustration and not by way of limitation. The reactants and reagents used in the reactions described below are readily available materials. Such materials can be conveniently prepared in accordance with conventional preparatory procedures or obtained from commercial sources.

Example 1

The following procedure was used to prepare a strong polymer film for use in the present invention. 0.75 grams methylenebisacrylamide, 0.56 g acrylamide, 4.70 g methacrylic acid, and 0.25 g poly(sodium 4-styrenesulfonate) were dissolved in 10 milliliters water and then 20 ml 40% KOH was added to the resulting solution, which was maintained at room temperature. 0.05 g ammonium persulfate was then added to the solution. A piece of fabric was soaked in the resulting monomer solution and then sandwiched between a piece of glass and a piece of PET transparent film. This was heated on a 75° C. hotplate for 1 minute and then irradiated under strong UV light for 5 minutes, whereby a strong polymer film was formed.

The resulting film is highly conductive of hydroxide ions, making it suitable for use in an alkaline hydrogen fuel cell. Here, the membrane film is sandwiched between an air cathode and a hydrogen anode, separating the air and hydrogen, while allowing the diffusion of hydroxide ions.

Example 2

In this example, a polymer based solid gel membrane was prepared in accordance with the principles of the invention and applied to the surface of a cathode. 0.75 g Methylenebisacrylamide, 0.56 g acrylamide, 4.70 g methacrylic acid, and 1.5 g polysulfone (anionic) were dissolved in 10 ml water and then 20 ml 40% KOH was added to the resulting solution, which was maintained at room temperature. 0.038 g ammonium persulfate dissolved in 1 ml water was added and the resulting solution was poured onto the surface of an air cathode. The cathode was then covered by a piece of PET film and heated on a 75° C. hotplate for 1 minute and then irradiated under strong UV light, whereby a strong polymer film was formed.

This cathode may be used with an anode prepared as in Example 3, below, or it may be used directly with a plain metal sheet, such as zinc, aluminum, cadmium, lithium, magnesium, or lead, in the formation of a corresponding metal/air fuel cell battery. Alternatively, the cathode on which the solid gel is grafted, as in Example 2, may form a separator/bifunctional electrode in a rechargeable electrochemical cell (metal/air) in accordance with the present invention, or it may be positioned next to the charging electrode in the rechargeable cell, as mentioned above.

Example 3

A polymer based ion conducting membrane was prepared and applied to the surface of an anode according to the principles of the present invention. 0.75 g methylenebisacrylamide, 1.5 g poly(sodium 4-styrenesulfonate), 5.18 g 1-vinyl-2-pyrrolidinone, and 3.36 g acrylic acid were dissolved in 30 ml $NH_4Cl$ and $K_2SO_4$ saturated aqueous solution, followed by the addition of 0.1 g ammonium persulfate. The solution was spread onto the anode surface, and covered by a PET film and then irradiated under strong UV light, whereby a strong polymer film was formed for use as a separator grafted onto the anode. In a fuel cell, the separator/anode is positioned next to the cathode, and in a rechargeable electrochemical cell, it is positioned next to the charging electrode or next to a single bifunctional electrode, when one is employed.

Example 4

A polymer-based solid gel membrane was prepared according to the present invention and processed to form a proton conducting film. 6.4 g 70% perchloric acid, 0.75 g methylenebisacrylamide, 5.18 g acrylic acid, and 0.1 g potassium sulfite (reducing agent) were dissolved in 27 ml water and then 0.1 g ammonium persulfate was added to the solution. A piece of fabric was soaked in the resulting monomer solution and then sandwiched between a piece of glass and a piece of PET transparent film. This was heated on an 85° C. hotplate for 1 minute and then irradiated under strong UV light for 8 minutes, whereby a strong polymer film was formed.

The resulting film is highly conductive of protons (hydrogen ions), making it suitable for use in a hydrogen fuel cell or for use as a separator in an acidic rechargeable electrochemical cell, such as in a rechargeable lead-acid battery. In a hydrogen fuel cell, the membrane film is sandwiched between an air cathode and a hydrogen anode, separating the air and hydrogen while allowing the diffusion of hydrogen ions.

Example 5

The principles of the present invention may also be applied to electrochromic devices. For example, one or several electrochromnic materials are dissolved in an aqueous monomer solution which is then applied to an electrode substrate. The substrate may be comprised of such materials as for example, platinum, gold, conductive glass, e.g., indium-tin oxide glass, or other electro-conductive materials. The solution is polymerized according to either of the above methods wherein the ECM's are contained within the polymer membrane formed on the surface of the substrate. Two such modified electrodes, containing the same or different ECM's, are used in the electrochromic device with one acting as the anode and the other as the cathode. The electrodes may be packed together as a complete display device or they may be separated by a liquid or solid electrolyte.

Example 6

The following procedure was used to prepare a strong polymer film for use as a separator in a rechargeable electrochemical cell. One and a half grams (1.5 g) polysulfone (anionic), 0.75 g methylenebisacrylamide, 0.56 g acrylamide, and 4.70 g methacrylic acid was dissolved in 10 mL water, and maintained at room temperature. Twenty (20) mL 50% KOH was added to the resulting solution. A piece of nylon fabric commercially available from Frendenberg Nonwovens as FS2213E was then soaked in the monomer solution. The solution was placed in an ice bath, and 0.10 g ammonium persulfate was added to the solution. The separator was then taken out of the solution and sandwiched between transparent PET film and glass. The 'sandwiched' separator was then heated on a hot plate at 90° C. for 20 minutes on each side, then irradiated under strong UV light for 7 minutes on each side. The conductivity of the resulting membrane was 0.11 S/cm.

Examples of other monomers that may be used in the formation of a solid gel membrane and separator of the invention include any water-soluble ethylenically unsaturated amides or acids, including, but not limited to, N-isopropylacrylamide, fumaramide, fumaric acid, N,N-dimethylacrylamide, 3,3-dimethylacrylic acid, and the sodium salt of vinylsulfonic acid.

Other cross-inking agents include, for example, any water-soluble N,N'-alkylidene-bis(ethylenically unsaturated amide).

Examples of polymers other than poly(sodium 4-styrenesulfonate) that may be used as reinforcing elements within the solid gel electrolyte may include any water-soluble or water-swellable polymers, such as, for example, carboxymethyl cellulose, polysulfone (anionic), sodium salt of poly(styrenesulfonic acid-co-maleic acid), and corn starch.

Suitable fabrics onto which the monomer solution may be applied include, for example, woven or non-woven fabrics such as polyolefins, polyamides, polyvinyl alcohol, and cellulose.

With regard to initiation of the polymerization reaction chemical initiators such as, ammonium persulfate, alkali metal persulfates or peroxides may optionally be used in combination with radical generating methods such as radiation, including for example, ultraviolet light, X-ray, γ-ray, and the like. However, the chemical initiators need not be added if the radiation alone is sufficiently powerful to begin the polymerization. As stated above, the polymerization may be conducted at temperatures ranging from room temperature up to about 130° C.

This invention has been described in terms of specific embodiments, set forth in detail. It should be understood, however, that these embodiments are presented by way of illustration only, and that the invention is not necessarily limited thereto. The principles of the present invention may, for example, also be applied in the preparation of a solid gel membrane for use in such other electrochemical systems as for example, Ni/Cd and Zn/MnO$_2$ cells. Additionally, other monomers, polymers, chemical polymerization initiators, reducing agents, and the like, other than those particularly disclosed herein might be used. Modifications and variations in any given material or process step will be readily apparent to those skilled in the art without departing from the true spirit and scope of the following claims, and all such modifications and variations are intended to be included within the scope of the present invention.

We claim:

1. A rechargeable electrochemical cell comprising a separator, an anode, a cathode, and a charging electrode,
   wherein said separator comprises an ion-conducting polymer-based solid gel membrane comprising a support onto which a polymer-based gel having an ionic species contained within a solution phase thereof is formed,
   wherein said polymer-based gel comprises a polymerization product of one or more monomers selected from the group of water soluble ethylenically unsaturated amides and acids, and a reinforcing element selected from the group of water soluble and water swellable polymers,
   wherein said ionic species is added to said one or more monomers, and said reinforcing element prior to polymerization,
   wherein said cathode and said charging electrode may be a single bifunctional electrode or may be individual and separate electrodes, and wherein said separator is positioned between said anode and said charging electrode.

2. The rechargeable electrochemical cell of claim 1, wherein said separator has an ionic conductivity of at least about 0.10 S/cm.

3. The rechargeable electrochemical cell of claim 1, wherein said one or more monomers is selected from the group of methylenebisacrylamide, acrylamide, methacrylic acid, acrylic acid, 1-vinyl-2-pyrrolidinone, N-isopropylacrylamide, fumaramide, fumaric acid, N,N-dimethylacrylamide, 3,3-dimethylacrylic acid, the sodium salt of vinylsulfonic acid, and combinations thereof.

4. The rechargeable electrochemical cell of claim 1, wherein said reinforcing element is selected from the group of poly(sodium 4-styrenesulfonate), carboxymethyl cellulose, polysulfone (anionic), sodium salt of poly(styrenesulfonic acid-co-maleic acid), and corn starch.

5. The rechargeable electrochemical cell of claim 4, wherein said polymer-based gel comprises said polymerization product of
   (a) methylenebisacrylamide, acrylamide, and methacrylic acid;
   (b) methylenebisacrylamide, acrylic acid, 1-vinyl-2-pyrrolidinone and a reducing agent;
   (c) methylenebisacrylamide, acrylic acid, and a reducing agent.

6. The rechargeable electrochemical cell of claim 1, wherein said polymerization is carried out using radical generating radiation selected from the group of X-ray, γ-ray, and ultraviolet radiation at a temperature ranging from room temperature up to about 130° C.

7. The rechargeable electrochemical cell of claim 6, wherein a chemical polymerization initiator selected from the group of ammonium persulfate, alkali metal persulfates and peroxides is added to said one or more monomers and said reinforcing element prior to polymerization.

8. The rechargeable electrochemical cell of claim 1, wherein said polymerization is carried out at a temperature ranging from room temperature to about 130° C., optionally using radical generating radiation selected from the group of X-ray, γ-ray, and ultraviolet radiation, and wherein a chemical polymerization initiator selected from the group of ammonium persulfate, alkali metal persulfates and peroxides is added to said one or more monomers and said reinforcing element prior to polymerization.

9. The rechargeable electrochemical cell of claim 1, wherein said cathode and said charging electrode are individual and separate electrodes, and
   wherein said charging electrode is positioned between said separator and said cathode.

10. The rechargeable electrochemical cell of claim 9, further comprising a porous spacer positioned between said charging electrode and said cathode.

11. The rechargeable electrochemical cell of claim 9, wherein said anode is a metal selected from the group of zinc, cadmium, lithium, magnesium, iron, and aluminum, and said cathode is an air cathode.

12. The rechargeable electrochemical cell of claim 11, wherein said charging electrode is selected from the group of platinum, nickel, nickel oxide, perovskite and its derivatives, carbon, and palladium.

13. The rechargeable electrochemical cell of claim 12, wherein said anode is zinc.

14. The rechargeable electrochemical cell of claim 12, further comprising a porous spacer positioned between said charging electrode and said air cathode.

15. The rechargeable electrochemical cell of claim 12, wherein said ionic species comes from an aqueous alkaline solution of potassium hydroxide, sodium hydroxide, lithium hydroxide, or combinations thereof, and wherein said hydroxide has a concentration ranging from about 0.1 wt. % to about 55 wt. %.

16. The rechargeable electrochemical cell of claim 15, wherein said hydroxide has a concentration of about 37.5 wt. %.

17. The rechargeable electrochemical cell of claim 15, wherein said separator has an ionic conductivity of at least about 0.10 S/cm.

18. The rechargeable electrochemical cell of claim 12, wherein said ionic species come from a neutral aqueous solution comprising:
   (a) ammonium chloride and potassium sulfate;
   (b) ammonium chloride, potassium sulfate, and sodium chloride; or
   (c) potassium sulfate and ammonium chloride.

19. The rechargeable electrochemical cell of claim 1, wherein said cathode and said charging electrode are a single bifunctional electrode.

20. The rechargeable electrochemical cell of claim 19, wherein said anode is a metal selected from the group of zinc, cadmium, lithium, magnesium, iron, and aluminum, and said single bifunctional electrode is an air cathode.

21. The rechargeable electrochemical cell of claim 20, wherein said ionic species comes from an aqueous alkaline solution of potassium hydroxide, sodium hydroxide, lithium hydroxide, or a mixture thereof, and wherein said hydroxide has a concentration ranging from about 0.1 wt. % to about 55 wt. %.

22. The rechargeable electrochemical cell of claim 21, wherein said hydroxide has a concentration of about 37.5 wt. %.

23. The rechargeable electrochemical cell of claim 21, wherein said separator has an ionic conductivity of at least about 0.10 S/cm.

24. The rechargeable electrochemical cell of claim 20, wherein said ionic species come from a neutral aqueous solution comprising:
   (a) ammonium chloride and potassium sulfate;
   (b) ammonium chloride, potassium sulfate, and sodium chloride; or
   (c) potassium sulfate and ammonium chloride.

25. The rechargeable electrochemical cell of claim 20, wherein said anode is zinc.

26. The rechargeable electrochemical cell of claim 19, wherein said anode is zinc or zinc oxide, and said single bifunctional electrode is selected from the group of nickel oxide, manganese dioxide, silver oxide, and cobalt oxide.

27. The rechargeable electrochemical cell of claim 26, wherein said ionic species comes from an aqueous alkaline solution of potassium hydroxide, sodium hydroxide, lithium hydroxide, or a mixture thereof, and wherein said hydroxide has a concentration ranging from about 0.1 wt. % to about 55 wt. %.

28. The rechargeable electrochemical cell of claim 27, wherein said hydroxide has a concentration of about 37.5 wt. %.

29. The rechargeable electrochemical cell of claim 28, wherein said separator has an ionic conductivity of at least about 0.10 S/cm.

30. The rechargeable electrochemical cell of claim 19, wherein said anode is selected from the group of iron and cadmium, and said single bifunctional electrode is nickel oxide.

31. The rechargeable electrochemical cell of claim 30, wherein said ionic species comes from an aqueous alkaline solution of potassium hydroxide, sodium hydroxide, lithium hydroxide, or a mixture thereof, and wherein said hydroxide has a concentration ranging from about 0.1 wt. % to about 55 wt. %.

32. The rechargeable electrochemical cell of claim 31, wherein said hydroxide has a concentration of about 37.5 wt. %.

33. The rechargeable electrochemical cell of claim 31, wherein said separator has an ionic conductivity of at least about 0.10 S/cm.

34. The rechargeable electrochemical cell of claim 19, wherein said anode is lead, and said single bifunctional electrode is lead oxide.

35. The rechargeable electrochemical cell of claim 34, wherein said ionic species comes from an aqueous acidic solution of perchloric acid, sulfuric acid, hydrochloric acid, phosphoric acid, or combinations thereof.

36. The rechargeable electrochemical cell of claim 35, wherein said separator has an ionic conductivity of at least about 0.10 S/cm.

37. The rechargeable electrochemical cell of claim 1, wherein said separator is formed directly onto said anode, said charging electrode, or said cathode, whereby said support is provided by said anode, by said charging electrode, or by said cathode, respectively.

38. The rechargeable electrochemical cell of claim 1, wherein said support is a woven or non-woven fabric selected from the group of polyamides, polyolefins, polyvinyl alcohol, and cellulose.

39. The rechargeable electrochemical cell of claim 1, further comprising an aqueous electrolyte in contact with said separator, said anode, said cathode, and said charging electrode.

40. A rechargeable electrochemical cell comprising a separator, a metal anode, an air cathode, and a charging electrode,
   wherein said separator comprises a hydroxide conducting polymer-based solid gel membrane comprising a support onto which a polymer-based gel having a hydroxide species contained within a solution phase thereof is formed,
   wherein said polymer-based gel comprises polysulfone and a polymerization product of methylenebisacrylamide, acrylamide, and methacrylic acid,
   wherein said hydroxide species comes from an aqueous alkaline solution having a concentration ranging from about 0.1 wt. % to about 55 wt. % potassium hydroxide, sodium hydroxide, lithium hydroxide, or a mixture thereof,
   wherein said hydroxide species is added to said methylenebisacrylamide, acrylamide, and methacrylic acid, and said polysulfone prior to polymerization,
   wherein said air cathode and said charging electrode may be a single bifunctional electrode or may be individual and separate electrodes,
   wherein said separator is positioned between said metal anode and said charging electrode,
   wherein said polymerization is carried out using radical generating radiation selected from the group of x-ray, γ-ray, and ultraviolet radiation; and wherein the ionic conductivity of said separator is at least about 0.10 S/cm.

41. The rechargeable electrochemical cell of claim 40, wherein a polymerization initiator is added to said methylenebisacrylamide, acrylamide, methacrylic acid, and said hydroxide species prior to polymerization.

42. The rechargeable electrochemical cell of claim 40, further comprising an aqueous liquid electrolyte in contact with said separator, said anode, said cathode, and said charging electrode.

* * * * *